US012656468B2

(12) United States Patent
Zeng et al.

(10) Patent No.: US 12,656,468 B2
(45) Date of Patent: Jun. 16, 2026

(54) PHYSICS-BASED MODELING OF RAIN AND SNOW EFFECTS IN VIRTUAL LiDAR

(71) Applicant: GM Global Technology Operations LLC, Detroit, MI (US)

(72) Inventors: Wei Zeng, Oakland Township, MI (US); Shuqing Zeng, Sterling Heights, MI (US); Huabing Zhu, Troy, MI (US); Jordan B. Chipka, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 913 days.

(21) Appl. No.: 18/047,102

(22) Filed: Oct. 17, 2022

(65) Prior Publication Data

US 2024/0134022 A1     Apr. 25, 2024

(51) Int. Cl.
| | |
|---|---|
| *G01S 7/497* | (2006.01) |
| *G01S 17/00* | (2020.01) |
| *G01S 17/89* | (2020.01) |
| *G01S 17/931* | (2020.01) |

(52) U.S. Cl.
CPC ............ *G01S 7/497* (2013.01); *G01S 17/006* (2013.01); *G01S 17/89* (2013.01); *G01S 17/931* (2020.01); *G01S 2007/4975* (2013.01)

(58) Field of Classification Search
CPC .... G01S 7/48–51; G01S 17/006; G06F 30/20; G06F 30/25; G06F 2111/08
See application file for complete search history.

(56) References Cited

U.S. PATENT DOCUMENTS

| | | | | |
|---|---|---|---|---|
| 2018/0275658 A1* | 9/2018 | Iandola | .................. | B60R 11/04 |
| 2019/0138848 A1* | 5/2019 | Gonzalez Aguirre | ....................... | |
| | | | | G06V 10/772 |
| 2021/0406722 A1* | 12/2021 | Armstrong-Crews | ....................... | |
| | | | | G06N 3/094 |

OTHER PUBLICATIONS

Zhao, Jian, et al. "Method and applications of LiDAR modeling for virtual testing of intelligent vehicles." IEEE Transactions on Intelligent Transportation Systems 22.5 (2020): 2990-3000. (Year: 2020).*
S. Hasirlioglu and A. Riener, "A General Approach for Simulating Rain Effects on Sensor Data in Real and Virtual Environments," in IEEE Transactions on Intelligent Vehicles, vol. 5, No. 3, pp. 426-438, Sep. 2020 (Year: 2020).*
Kilic, Velat, et al. "Lidar Light Scattering Augmentation (LISA): Physics-based Simulation of Adverse Weather Conditions for 3D Object Detection." arXiv preprint arXiv:2107.07004 (2021). (Year: 2021).*

(Continued)

*Primary Examiner* — Yuqing Xiao
*Assistant Examiner* — Sean C. Grant
(74) *Attorney, Agent, or Firm* — Vivacqua Crane, PLLC

(57) ABSTRACT

A method of modeling precipitation effects in a virtual LiDAR sensor, the method includes receiving a point cloud model representing three-dimensional coordinates of objects as the objects would be sensed by a LiDAR sensor. The method further includes generating a stochastic model of rainfall or snowfall, estimating a probability that a light source from the LiDAR sensor hits a raindrop or a snowflake based on the stochastic model, and modifying the received point cloud model to include effects induced by the modeled rainfall or snowfall based on the probability that light sourced from the LiDAR sensor encounters a raindrop or a snowflake.

9 Claims, 2 Drawing Sheets

(56)                    References Cited

OTHER PUBLICATIONS

Y.-C. Shih, W.-H. Liao, W.-C. Lin, S.-K. Wong and C.-C. Wang, "Reconstruction and Synthesis of Lidar Point Clouds of Spray," in IEEE Robotics and Automation Letters, vol. 7, No. 2, pp. 3765-3772, Apr. 2022 (Year: 2022).*

J. R. V. Rivero, T. Gerbich, B. Buschardt and J. Chen, "The Effect of Spray Water on an Automotive LIDAR Sensor: A Real-Time Simulation Study," in IEEE Transactions on Intelligent Vehicles, vol. 7, No. 1, pp. 57-72, Mar. 2022 (Year: 2022).*

Linnhoff, Clemens, et al. "Simulating road spray effects in automotive lidar sensor models." arXiv preprint arXiv:2212.08558 (2022). (Year: 2022).*

Yang, Donglin, et al. "Realistic Rainy Weather Simulation for LiDARs in CARLA Simulator." arXiv preprint arXiv:2312.12772 (2023). (Year: 2023).*

* cited by examiner

PHYSICS-BASED MODELING OF RAIN AND SNOW EFFECTS IN VIRTUAL LiDAR

INTRODUCTION

The present disclosure relates to a method of modeling rain and snow effects in a virtual LiDAR sensor.

LiDAR (Light Detection And Ranging) sensors can be used to determine distances to an object by emitting a laser pulse and determining the time it takes for the pulse to bounce off the object and return to the laser source. In an automotive setting, LiDAR sensors may be used as part of an Advanced Driver Assistance System (ADAS). In developing an ADAS, various scenarios may be evaluated to determine the response of the ADAS under development. This may include simulating various environmental conditions that may be inconvenient or risky to evaluate in the field, such as extreme weather or traffic conditions. Such simulations may include modeling sensor responses under various conditions.

While current ADAS achieve their intended purpose, there is a need for a new and improved system and method for evaluating the performance of an ADAS under a wide range of conditions.

SUMMARY

According to several aspects, a method of modeling precipitation effects in a virtual LiDAR sensor, the method includes receiving a point cloud model representing three-dimensional coordinates of objects as the objects would be sensed by a LiDAR sensor. The method further includes generating a stochastic model of rainfall or snowfall, and estimating a probability that a light source from the LiDAR sensor hits a raindrop or a snowflake based on the stochastic model, and modifying the received point cloud model to include effects induced by the modeled rainfall or snowfall based on the probability that light sourced from the LiDAR sensor encounters a raindrop or a snowflake.

In an additional aspect of the disclosed method, the step of modifying the point cloud model further includes modeling effects of attenuation of light sourced from the LiDAR sensor or returned to the LiDAR sensor due to a raindrop or a snowflake.

In another aspect of the disclosed method, the step of modifying the point cloud model further includes modeling effects of water splashing from a vehicle tire.

In another aspect of the disclosed method, modeling effects of water splashing from a vehicle tire includes a correlation between vehicle speed and splashing distance.

In another aspect of the disclosed method, modeling effects of water splashing from a vehicle tire includes a correlation between vehicle speed and droplet size.

In another aspect of the disclosed method, wherein modeling effects of water splashing from a vehicle tire includes a correlation between vehicle speed and splashing pattern distribution.

In another aspect of the disclosed method, the step of modifying the point cloud model further includes modeling backscattering intensity from raindrops or snowflakes hit by light sourced from the LiDAR sensor.

According to several aspects, a virtual LiDAR sensor includes one or more modules configured to receive a point cloud model representing three-dimensional coordinates of objects as the objects would be sensed by a LiDAR sensor. The module or modules are further configured to generate a stochastic model of rainfall or snowfall, estimate a probability that a light source from the LiDAR sensor hits a raindrop or a snowflake based on the stochastic model, and modify the received point cloud model to include effects induced by the modeled rainfall or snowfall based on the probability that light sourced from the LiDAR sensor encounters a raindrop or a snowflake.

In another aspect of the disclosed virtual LiDAR sensor, the one or more modules are further configured to modify the received point cloud model to include modeled effects of attenuation of light sourced from the LiDAR sensor or returned to the LiDAR sensor due to a raindrop or a snowflake.

In an additional aspect of the disclosed virtual LiDAR sensor, modeled effects of water splashing from a vehicle tire include a correlation between vehicle speed and splashing distance.

In another aspect of the disclosed virtual LiDAR sensor, modeled effects of water splashing from a vehicle tire include a correlation between vehicle speed and droplet size.

In another aspect of the disclosed virtual LiDAR sensor, modeled effects of water splashing from a vehicle tire include a correlation between vehicle speed and splashing pattern distribution.

In another aspect of the disclosed virtual LiDAR sensor, the one or more modules are further configured to modify the received point cloud model to include modeled effects of backscattering intensity from raindrops or snowflakes hit by light sourced from the LiDAR sensor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Autonomous driving systems, also known as Advanced Driver Assistance Systems (ADAS), have shown great potential for improving traffic congestion and reducing accidents associated with transportation vehicles. Development, training, and evaluation of autonomous driving systems requires consideration of the performance of these systems in a wide variety of operating conditions. For example, the performance of an autonomous driving system in rainy or snowy weather may be affected by the response of a sensor to rain and/or snow.

Simulation of autonomous driving systems aids in development and evaluation during certain stages of the development process. In order to develop a robust autonomous driving system, it is desirable to simulate the performance of the system under a wide range of conditions that may be encountered in use. An autonomous vehicle simulator may be used to receive sensor inputs, either real or simulated, from sensors that may be deployed on or near an autonomous vehicle. The autonomous vehicle simulator can process the received inputs to produce control outputs such as vehicle acceleration, braking, and steering controls. Utilizing the autonomous vehicle simulator, performance of the simulated vehicle can be safely evaluated under controlled conditions that may be difficult or dangerous to achieve with a real vehicle in real world conditions. For example, real world evaluation of performance under rainy or snowy conditions would require either waiting for the desired weather or generating the desired conditions in an environmental chamber.

In an automotive setting, a LiDAR (Light Detection And Ranging) sensor may be used as part of an Advanced Driver Assistance System (ADAS). The LiDAR sensor is used to collect data from a target region, the data representing bearing and distance from objects in the target region to the LiDAR sensor. This data can be processed to provide real-time mapping of objects in regions in proximity to an automotive vehicle, enabling driver assistance functions such as lane departure warning, intelligent cruise control, or autonomous vehicle operation.

Figure 1:
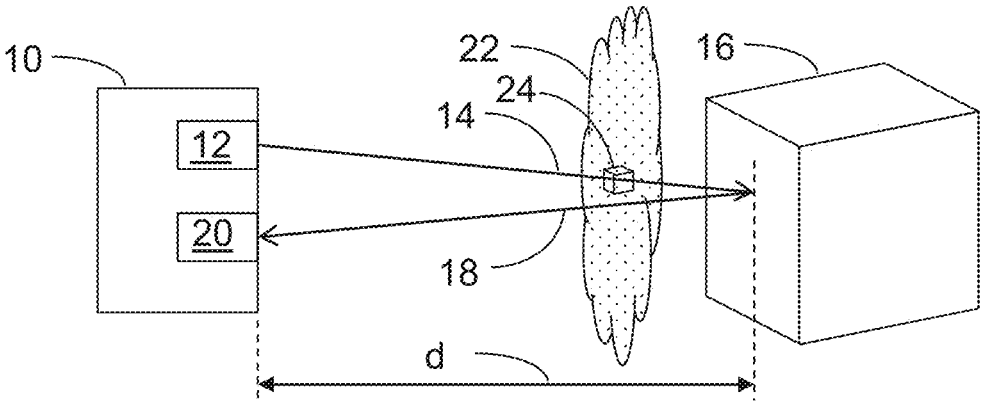
FIG. 1 is an illustration of a LiDAR time-of-flight sensing system, according to an exemplary embodiment.

FIG. 1 conceptually illustrates a LiDAR time-of-flight technique. Referring to FIG. 1, a LiDAR unit 10 includes a laser source 12 and a laser detector 20. An object 16 to be sensed is located at a distance "d" from the LiDAR unit 10. A laser beam 14 is emitted by the laser source 12 and is reflected by the object 16. The reflected beam 18 is sensed by the laser detector 20. The distance "d" can be calculated by the relationship:

$$d = \frac{ct}{2}$$

where c is the speed of light and t is the time-of-flight for light emitted from the laser source 12 to be received by the laser detector 20. LiDAR sensor data may be processed to display a point cloud representing three-dimensional coordinates of objects in the target region.

With continue reference to FIG. 1, a region 22 encompassing raindrops or snowflakes is indicated. While the region 22 is depicted as being located between the LiDAR unit 10 and the object 16, it will be appreciated that the region 22 containing raindrops or snowflakes may extend to fill the entire volume between the LiDAR unit 10 and the object 16 or may even extend so as to additionally encompass the LiDAR unit 10 and/or the object 16. In the present disclosure, rainfall and snowfall are considered to be stochastic processes, that is, processes having a random probability distribution or pattern that may be analyzed statistically but may not be predicted precisely.

Figure 2:
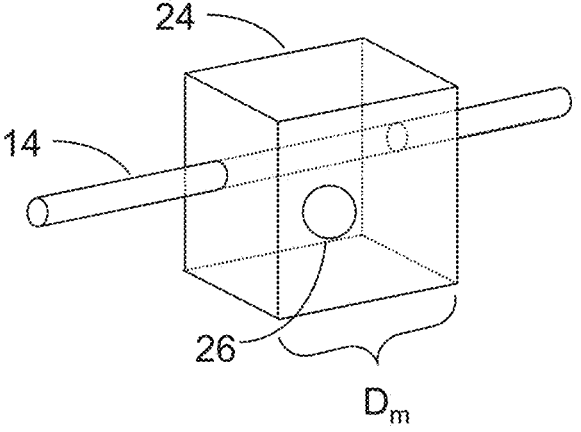
FIG. 2 is a representation of a laser beam passing through a volume that contains a raindrop, according to an exemplary embodiment.

Referring to FIG. 2 and again to FIG. 1, a volume represented as a cube 24 can be defined in the region 22. The probability of the laser beam 14 hitting a raindrop 26 depends on several factors including number of raindrops 26 in the cubic volume 24, radius of the raindrop 26, diameter of the laser beam 14, and $D_m$, the length of the cubic volume 24 in a direction parallel to the laser beam 14. Published data is available that relates drop diameter and terminal velocity to various accumulation rates of rain showers. With this information, the probability of the laser beam 14 encountering a raindrop 26 can be estimated for various weather scenarios as:

$$P = ((Ar/Ar_0)/(V/V_0)) \cdot (D/D_0) \cdot \pi R^2 / D_m^2$$

where:
P represents the probability of the laser beam 14 encountering a raindrop 26;
$Ar/Ar_0$ represents the normalized (dimensionless) drop arrival rate;
$V/V_0$ represents the normalized (dimensionless) drop velocity;
$D/D_0$ represents the normalized (dimensionless) laser beam diameter;
R represents the radius of the raindrop; and
$D_m$ represents the length of the cubic volume 24 in a direction parallel to the laser beam 14.

If the probability of the laser beam 14 encountering the raindrop 26 is sufficiently high, a physics-based calculation of the reflection and backscatter of the incident laser light interacting with the raindrop is performed to determine the effect of the raindrop on the output of the LiDAR sensor. As a non-limiting example, a GOA (geometric optical approximation) theory on spherical particles model is given as:

$$i_{j,p} = \frac{R^2}{r^2} i_0 \varepsilon_{j,p} D$$

$$\varepsilon_{j,p} D = f(\theta, m, p)$$

where:
$i_{j,p}$ represents the intensity after scattering;
$i_0$ represents the incident intensity;
R represents the droplet radius;
r represents the distance between the droplet and the LiDAR receiver;
$\theta$ represents the scattering angle;
m represents the refraction index; and
p represents the path.

In a non-limiting example, a Gaussian distribution from approximately 0.5 mm to approximately 5 mm is assumed for raindrop size. The raindrop appears in the LiDAR point cloud if sufficient backscattering intensity to the LiDAR receiver is detected.

To simulate reflection and backscattering effects for snowflakes, a hemispherical-directional reflectance factor (HDRF) model may be used. As a non-limiting example, an HDRF value of ~0.6 to 0.9 may be used to calculate an estimated reflected intensity. The snowflake appears in the LiDAR point cloud if sufficient backscattering intensity to the LiDAR receiver is detected.

Figure 3:
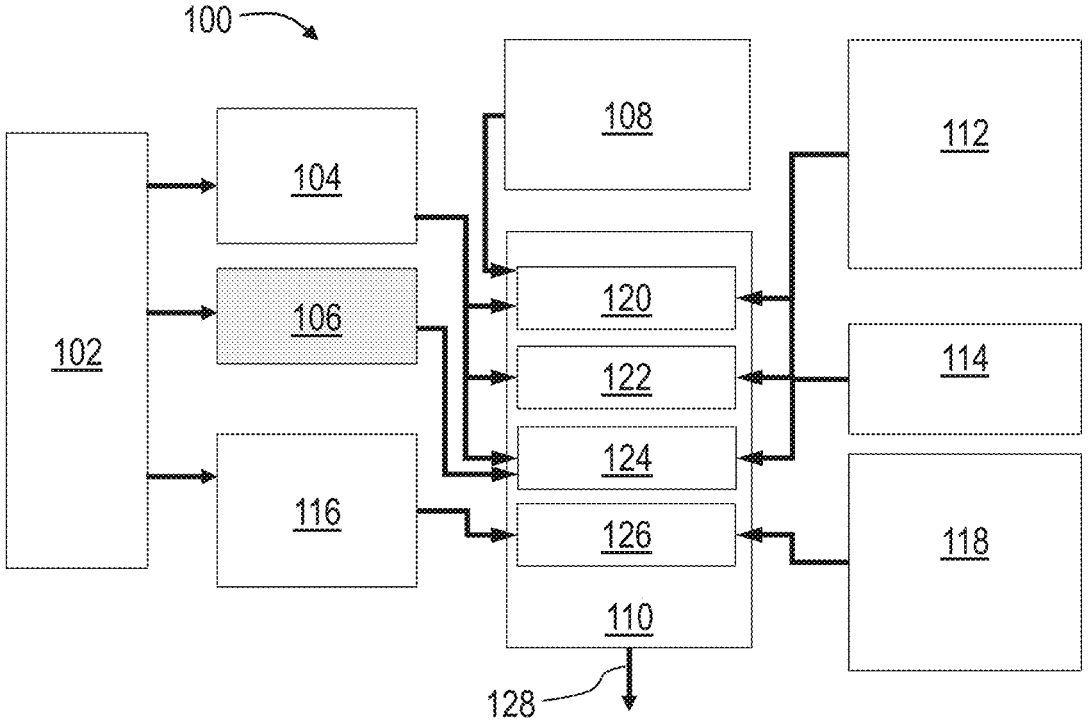
FIG. 3 is a representation of a virtual LiDAR sensor, according to an exemplary embodiment.

Referring to FIG. 3, an example of a virtual LiDAR sensor 100 is presented. The exemplary virtual LiDAR sensor 100 comprises a plurality of functional modules implemented in software, each of which will be discussed individually in further detail. In various arrangements, the software modules comprising the virtual LiDAR sensor 100 are controlled by an algorithm implanted in an electronic control unit (ECU) situated, for example, in a motor vehicle. The ECU is a non-generalized, electronic control device having a preprogrammed digital computer or processor, memory or non-transitory computer readable medium used to store data such as control logic, software applications, instructions, computer code, data, lookup tables, etc., and a transceiver. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code. The processor is configured to execute the code or instructions.

The algorithm in various arrangements is an application implemented as a software program configured to perform a specific function or set of functions. The application may include one or more computer programs, software components, sets of instructions, procedures, functions, objects, classes, instances, related data, or a portion thereof adapted for implementation in a suitable computer readable program code. The applications may be stored within the memory or in additional or separate memory.

The functional modules comprising the virtual LiDAR sensor 100 include a point cloud module 104, a labeling module 106, a reflection and backscattering module 108, a rain and snow features module 110, a stochastic model inputs module 112, a road surface reflection module 114, a ground truth module 116, and a water splashing module 118. The rain and snow features module 110 is depicted in FIG. 3 as including a raindrop and snowflake point cloud submodule 120, a noisy point cloud submodule 122, a wet surface point cloud submodule 124, and a splashed water point cloud submodule 126.

The virtual LiDAR sensor 100 receives information from a functional structure shown as block 102. In an exemplary embodiment, the functional structure 102 is an autonomous vehicle simulator comprising a software platform that provides simulated raw (physics based) LiDAR point cloud information to the point cloud module 104. In an alternative embodiment, the functional structure 102 is an actual automotive vehicle containing one or more LiDAR sensors implemented in hardware that provide raw measured LiDAR point cloud information to the point cloud module 104. The functional structure 102 also provides semantic segmentation information to the labeling module 106 associated with the point cloud information provided to the point cloud module 104. Additionally, the functional structure 102 provides ground truth information regarding remote vehicles to the ground truth module 116, including remote vehicle bounding boxes, remote vehicle velocity, and remote vehicle heading.

With continued reference to FIG. 3, the rain and snow features module 110 receives point cloud information from the point cloud module 104, from the labeling module 106, and from the ground truth module 116. The rain and snow features module 110 also receives information from the reflection and backscattering module 108. In an exemplary embodiment, the reflection and backscattering module 108 incorporates a GOA (geometric optical approximation) model for rain and an HDRF (hemispherical-directional reflectance factor) model for snow.

The rain and snow features module 110 additionally receives information from the stochastic model inputs module 112. In a non-limiting exemplary embodiment, the stochastic model inputs module 112 includes stored presets representing characteristics of rain and snow at various intensities, i.e., mild, moderate, or heavy. The exemplary stochastic model inputs module 112 also includes a table representing a probability that the laser beam 14 encounters a raindrop or snowflake, as well as a table representing laser energy attenuation resulting from such an encounter.

With continued reference to FIG. 3, the raindrop and snowflake point cloud submodule 120 of the rain and snow features module 110 uses information from the stochastic model inputs module 112 along with information from the point cloud module 104 and the reflection and backscattering module 108 to generate point clouds of raindrops or snowflakes.

The noisy point cloud submodule 122 of the rain and snow features module 110 uses information from the stochastic model inputs module 112 along with information from the point cloud module 104, the labeling module 106 and the reflection and backscattering module 108 to generate noisy point clouds for static objects and actors, recognizing that the rain and/or snow results in reduced range for sensing static objects and actors included in the raw LiDAR point cloud from the point cloud module 104.

Continuing to refer to FIG. 3, the wet surface point cloud submodule 124 of the rain and snow features module 110 additionally communicates with the road surface reflection module 114. The road surface reflection module 114 provides information regarding laser light reflection from a road surface that contains rain or snow accumulation. In an exemplary embodiment, the road surface reflection module 114 incorporates a BRDF (bidirectional reflectance distribution function) quasi-specular model for rain and an HDRF (hemispherical-directional reflectance factor) model for snow. The wet surface point cloud submodule 124 uses the information from the road surface reflection module 114 to generate point clouds including road surface markings (e.g., lane marking and crosswalks) covered with a water layer.

With continued reference to FIG. 3, splashed water point cloud submodule 126 of the rain and snow features module 110 additionally communicates with the ground truth module 116 to receive bounding box, velocity, and heading information regarding remote vehicles. The splashed water point cloud submodule 126 also communicates with the water splashing module 118. The water splashing module 118 provides correlation between remote vehicle speed and splashing distance. The water splashing module 118 also provides droplet size and splashing pattern distribution. The water splashing module 118 additionally provides splashing region by remote vehicle speed and bounding box size. With the information received from the ground truth module 116 and the water splashing module 118, the splashed water point cloud submodule 126 generates splashed water point clouds.

Each of the points in the point clouds generated by the raindrop and snowflake point cloud submodule 120, the noisy point cloud submodule 122, the wet surface point cloud submodule 124, and the splashed water point cloud submodule 126 includes geometry information (x, y, z coordinates from the point cloud module 104 and/or from the ground truth module 116). Each of the points in the point clouds generated by the raindrop and snowflake point cloud submodule 120, the noisy point cloud submodule 122, the wet surface point cloud submodule 124, and the splashed water point cloud submodule 126 also has an associated intensity value that takes into consideration reflection and/or backscattering due to water droplets (rainfall or splashed water) and/or snowflakes. If the intensity value for a given point is above a predetermined signal-to-noise threshold, the x, y, z, and intensity information for that point is included as part of a modified point cloud 128 that is an output of the virtual LiDAR sensor 100. In a non-limiting embodiment, the functional block 102 receives the modified point cloud 128 and processes it to evaluate the performance of an autonomous vehicle system under rainy or snowy conditions.

A virtual LiDAR sensor of the present disclosure offers several advantages. These include stochastic modeling of rainfall and snowfall and an estimation of the chance that a laser beam hits a raindrop or snowflake. The disclosed approach accounts for physics-based laser beam attenuation in rain or snow and estimates backscattering intensity from raindrops or snowflakes hit by laser beams. Backscattering intensity on the road surface with accumulated water or snow as well as the water droplets splashed by wheels is also simulated. The rain and snow effects are applied directly on a point cloud, making this approach independent of autonomous vehicle simulation platform and LiDAR approach. The disclosed approach also involves a method to simplify the models for real-time simulation.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of modeling precipitation effects in a virtual LiDAR sensor, the method comprising:
   receiving a point cloud model representing three-dimensional coordinates of objects as the objects would be sensed by a LiDAR sensor;
   generating a stochastic model of rainfall or snowfall;
   estimating a probability that a light source from the LiDAR sensor hits a raindrop or a snowflake based on the stochastic model, the probability P being determined using a stochastic formulation given by:

$$P=((Ar/Aro)/(V/Vo))\cdot(D/Do)\cdot(\pi R_2/Dm_2),$$

where Ar/Aro is a normalized drop arrival rate, V/Vo is a normalized drop velocity, D/Do is a normalized laser beam diameter, R is a droplet radius, and Dm is a length of a cubic volume in a direction parallel to the laser beam;
   identifying whether the estimated probability is above a threshold; and
   modifying the received point cloud model to include effects induced by the modeled rainfall or snowfall in response to the estimated probability, including performing a physics-based calculation of reflection and backscatter of incident laser light interacting with a raindrop when the estimated probability is above the threshold, the physics-based calculation comprising determining an intensity after scattering i(j,p) according to:

$$i(j,p)=(R^2/r^2)\cdot i_0\cdot\varepsilon(j,p)D,$$

where $i_0$ is an incident intensity, r is a distance between the droplet and a LiDAR receiver, and $\varepsilon(j,p)D$ is a scattering coefficient defined by $\varepsilon(j,p)D=f(\theta, m, p)$, with $\theta$ being a scattering angle, m being a refraction index, and p being a path such that the modification reflects the likelihood that light sourced from the LiDAR sensor encounters a raindrop or a snowflake.

2. The method of claim 1, wherein the step of modifying the point cloud model further includes modeling effects of attenuation of light sourced from the LiDAR sensor or returned to the LiDAR sensor due to a raindrop or a snowflake.

3. The method of claim 1, wherein the step of modifying the point cloud model further includes modeling backscattering intensity from raindrops or snowflakes hit by light sourced from the LiDAR sensor.

4. A virtual LiDAR sensor comprising a one or more modules, the one or modules configured to:
   receive a point cloud model representing three-dimensional coordinates of objects as the objects would be sensed by a LiDAR sensor;
   generate a stochastic model of rainfall or snowfall;
   estimate a probability that a light source from the LiDAR sensor hits a raindrop or a snowflake based on the stochastic model, the probability P being determined using a stochastic formulation given by:

$$P=((Ar/Aro)/(V/Vo))\cdot(D/Do)\cdot(\pi R^2/Dm^2),$$

where Ar/Aro is a normalized drop arrival rate, V/Vo is a normalized drop velocity, D/Do is a normalized laser beam diameter, R is a droplet radius, and Dm is a length of a cubic volume in a direction parallel to the laser beam;
   identifying whether the estimated probability is above a threshold; and
   modify the received point cloud model to include effects induced by the modeled rainfall or snowfall in response to the estimated probability, including performing a physics-based calculation of reflection and backscatter of incident laser light interacting with a raindrop when the estimated probability is above the threshold, the physics-based calculation comprising determining an intensity after scattering i(j,p) according to:

$$i(j,p)=(R^2/r^2)\cdot i_0\cdot\varepsilon(j,p)D,$$

where $i_0$ is an incident intensity, r is a distance between the droplet and a LiDAR receiver, and $\varepsilon(j,p)D$ is a scattering coefficient defined by $\varepsilon(j,p)D=f(\theta, m, p)$, with $\theta$ being a scattering angle, m being a refraction index, and p being a path such that the modification reflects the likelihood that light sourced from the LiDAR sensor encounters a raindrop or a snowflake.

5. The virtual LiDAR sensor of claim 4, wherein the one or modules are further configured to modify the received point cloud model to include modeled effects of attenuation of light sourced from the LiDAR sensor or returned to the LiDAR sensor due to a raindrop or a snowflake.

6. The virtual LiDAR sensor of claim 4, wherein the one or modules are further configured to modify the received point cloud model to include modeled effects of backscattering intensity from raindrops or snowflakes hit by light sourced from the LiDAR sensor.

7. A vehicle system comprising:
   a vehicle;
   a LiDAR sensor mounted to the vehicle, the LiDAR sensor configured to provide raw point cloud information;
   a virtual LiDAR sensor configured to receive the raw point cloud information and to generate a modified point cloud that incorporates simulated effects of precipitation, the virtual LiDAR sensor further configured to:
   generate a stochastic model of rainfall or snowfall;
   estimate a probability that a light source from the LiDAR sensor hits a raindrop or a snowflake based on the stochastic model, the probability P being determined using a stochastic formulation given by:

$$P=((Ar/Aro)/(V/Vo))\cdot(D/Do)\cdot(\pi R^2/Dm^2),$$

where Ar/Aro is a normalized drop arrival rate, V/Vo is a normalized drop velocity, D/Do is a normalized laser beam diameter, R is a droplet radius, and Dm is a length of a cubic volume in a direction parallel to the laser beam;

identifying whether the estimated probability is above a threshold; and modify the received point cloud model to include effects induced by the modeled rainfall or snowfall in response to the estimated probability, including performing a physics-based calculation of reflection and backscatter of incident laser light interacting with a raindrop when the estimated probability is above the threshold, the physics-based calculation comprising determining an intensity after scattering i(j,p) according to:

$$i(j,p) = (R^2/r^2) \cdot i_0 \cdot \varepsilon(j,p)D,$$

where $i_0$ is an incident intensity, r is a distance between the droplet and a LiDAR receiver, and $\varepsilon(j,p)D$ is a scattering coefficient defined by $\varepsilon(j,p)$ $D=f(\theta, m, p)$, with $\theta$ being a scattering angle, m being a refraction index, and p being a path, such that the modification reflects the likelihood that light sourced from the LiDAR sensor encounters a raindrop or a snowflake.

8. The vehicle system of claim 7, wherein the virtual LiDAR sensor is further configured to modify the received point cloud model to include modeled effects of attenuation of light sourced from the LiDAR sensor or returned to the LiDAR sensor due to a raindrop or a snowflake.

9. The vehicle system of claim 7, wherein the virtual LiDAR sensor is further configured to modify the received point cloud model to include modeled effects of backscattering intensity from raindrops or snowflakes hit by light sourced from the LiDAR sensor.

* * * * *